United States Patent [19]

Utagawa

[11] Patent Number: 5,502,537
[45] Date of Patent: Mar. 26, 1996

[54] FOCUS ADJUSTMENT DEVICE HAVING PREDICTIVE FUNCTION

[75] Inventor: Ken Utagawa, Yokohama, Japan

[73] Assignee: Nikon Corporation, Tokyo, Japan

[21] Appl. No.: 138,007

[22] Filed: Oct. 19, 1993

[30] Foreign Application Priority Data

Oct. 19, 1992 [JP] Japan ................................ 4-279951

[51] Int. Cl.⁶ ............................................. G03B 13/36
[52] U.S. Cl. .................................................. 354/402
[58] Field of Search .......................... 354/400, 402

[56] References Cited

U.S. PATENT DOCUMENTS

| | | | |
|---|---|---|---|
| 5,216,460 | 6/1993 | Yoshimura et al. | 354/402 |
| 5,239,330 | 8/1993 | Venaka | 354/402 |
| 5,239,332 | 8/1993 | Muramatsu et al. | 354/402 |
| 5,255,044 | 10/1993 | Ishiguro | 354/402 |
| 5,264,893 | 11/1993 | Nonaka | 354/402 |
| 5,270,763 | 12/1993 | Ogasawara | 354/402 |
| 5,276,476 | 1/1994 | Venaka | 354/402 |
| 5,291,235 | 3/1994 | Venaka | 354/402 |
| 5,327,190 | 7/1994 | Nakamura et al. | 354/402 |

*Primary Examiner*—Russell E. Adams

[57] ABSTRACT

A camera which provides accurate prediction of future field position accompanying the movement of a photographic subject. The future field position is predicted based upon focus detection results taken during a short time period and during a long time period relative to a predetermined time period. A selection of the focus detection results taken either during the short time period or during the long time period, used to predict future field position, is made based upon parameters which indicate at least one of field movement speed, field movement acceleration, focal length of the photographic lens, and focusing distance. The focus adjustment device is capable of discriminating between a sudden change in field position and a gradual change in field position in order to modify the method by which prediction of future field position is performed. Additionally, the focus detection device performs prediction of future field position accurately when photography is performed in rapid succession.

19 Claims, 13 Drawing Sheets

FOCUS ADJUSTMENT DEVICE HAVING PREDICTIVE FUNCTION

BACKGROUND OF THE INVENTION

1. Field of the Invention

The present invention relates to a focus detection device having a predictive function, and in particular it relates to a focus detection device for a camera having a predictive function to determine a quantity relating to a future photographic field position or speed of movement of a photographic field when a photographic subject is moving close to or distant from a camera.

2. Description of the Related Art

Cameras are known which are capable of predicting a future photographic field position for a photographic subject based upon past focus detection results. Further, cameras are known which predict a future field position by utilizing focus detection results from among one or more intermittently output focus detection results, subject to the influence of any error contained in the previously determined focus detection results.

An example of a method for predicting the future field position of a moving photographic subject is disclosed in Japanese Laid-Open Patent Publication No. 63-148218 ("JP-A-63-148218"), which describes a method wherein a prediction is made using two focus detection results. The method utilized in JP-A-63-148218 is shown in FIGS. 27 and 28. As seen in FIG. 27, which plots the photographic field position Z on the ordinate and plots time t on the abscissa, a prediction is made using a focus detection result at t1, and a focus detection result at a time ΔtL prior to t1. The broken-line arrows show the scatter in the error in the focus detection results. Based upon the scatter in the error of the focus detection results determined at t1 and at t1–ΔtL, an estimated scatter of 40, as seen in the figure, is derived. FIG. 28 illustrates a situation where a prediction is made using two focus detection results at t1 and at a time ΔtS prior to t1, where ΔtS is smaller than ΔtL. The broken-line arrows in FIG. 28 show the scatter in the error in the focus detection results. Based upon the scatter in the error of the focus detection results determined at t1 and t1–ΔtS, an estimated scatter of 50, as seen in the figure, is derived. Although the degree of scatter depicted in FIGS. 27 and 28 is exaggerated for ease of understanding, it can be seen that according to the method disclosed in JP-A-63-148218 the prediction error increases as the time interval between focus detection results used for prediction becomes shorter. Thus, according to JP-A-63-148218, in order to increase the accuracy of prediction, focus detection results should be taken at suitable time intervals.

Prediction of the future field position using the above-described method is possible with good accuracy when the change of field movement speed is small. However, when the change in field movement speed is large, precise prediction is not possible. For example, FIGS. 29 and 30 graph the change of relative field position for a car moving from far to near opposite a photographic lens. As seen in FIGS. 29 and 30, field position Z is plotted on the ordinate and time t is plotted on the abscissa. The change in field movement speed at time t1 is small, and for the reasons already described with respect to FIGS. 27 and 28, at time t1, taking a larger time interval between focus detection results, as shown in FIG. 29, results in better accuracy of prediction. However, at time 12, in FIG. 29, when the change in field movement speed is large and the prediction is made using the result of a large time interval ΔtL, an erroneous prediction is performed.

In order to solve the problem of erroneous prediction when there is a sudden change in the field movement speed, as seen, for example, at position t2 in FIG. 30, a smaller time interval ΔtS between focus detection results is used. However, it is necessary to discriminate between the situation when the change in field movement speed is sudden, and the situation in which the change is gradual, such that the method of prediction may be modified based on the result of this discrimination.

SUMMARY OF THE INVENTION

It is therefore an object of the present invention to provide a camera which performs accurate prediction of future field position.

It is a further object of the invention to provide a camera which performs accurate prediction of future field position both when the change in field movement speed is sudden and when the change in field movement speed is gradual.

It is a further object of the present invention to provide a camera which performs accurate prediction of future field position based upon focus detection results taken during a short time period and during a long time period.

It is still a further object of the present invention to provide a camera which performs accurate prediction of a future field position based upon a first quantity related to field movement speed during a short time period and a second quantity related to field movement speed during a long time period.

It is yet a further object of the present invention to provide a camera which performs accurate prediction of a future field position based upon a combination of a first quantity related to field movement speed during a short time period and a second quantity related to field movement speed during a long time period.

Another object of the present invention is to provide a camera which performs accurate prediction of a future field position in which either a first quantity related to field movement speed during a short time period, or a second quantity related to field movement speed during a long time period is selected based upon parameters indicating field movement speed or field movement acceleration.

It is another object of the present invention to provide a camera which performs accurate prediction of a future field position by discriminating the situation in which the change of field movement speed accompanying the movement of a photographic subject is large.

Another object of the present invention is to provide a camera which performs accurate prediction of future field position by modifying the method of prediction determination based upon whether the field movement speed is large.

It is still a further object of the present invention to provide a camera which performs accurate prediction of future field position during photography in a rapid succession.

It is another object of the present invention to provide a camera which performs accurate prediction of a future field position by determining a plurality of predicted field positions and selecting an appropriate one as a future field position.

These and other objects of the present invention are achieved by providing a focus adjustment device which intermittently outputs a defocus quantity indicating a displacement of an imaging surface of a photographic lens from a predetermined detection surface. A lens drive unit drives the photographic lens to the focused state based upon the defocus quantity. A first quantity related to the speed of movement of the photographic subject is determined based upon a plurality of the defocus quantities generated during a time period longer than a predetermined time period. A second quantity related to the speed of movement of the photographic subject is also determined based upon a plurality of the defocus quantities during a shorter time range than the predetermined time period. Parameters are determined in order to decide upon the appropriateness of the first and second quantities. According to the calculated parameters, the lens drive unit is controlled so as to correct the movement of the field position accompanying the movement of a photographic subject based upon whether the first quantity, the second quantity calculated above or a combination of the first and second quantities.

BRIEF DESCRIPTION OF THE DRAWINGS

These and other objects and advantages of the present invention will become apparent and more readily appreciated from the following description of the present preferred embodiments, taken in conjunction with the accompanying drawings, of which.

DESCRIPTION OF THE PREFERRED EMBODIMENTS

Figure 1:
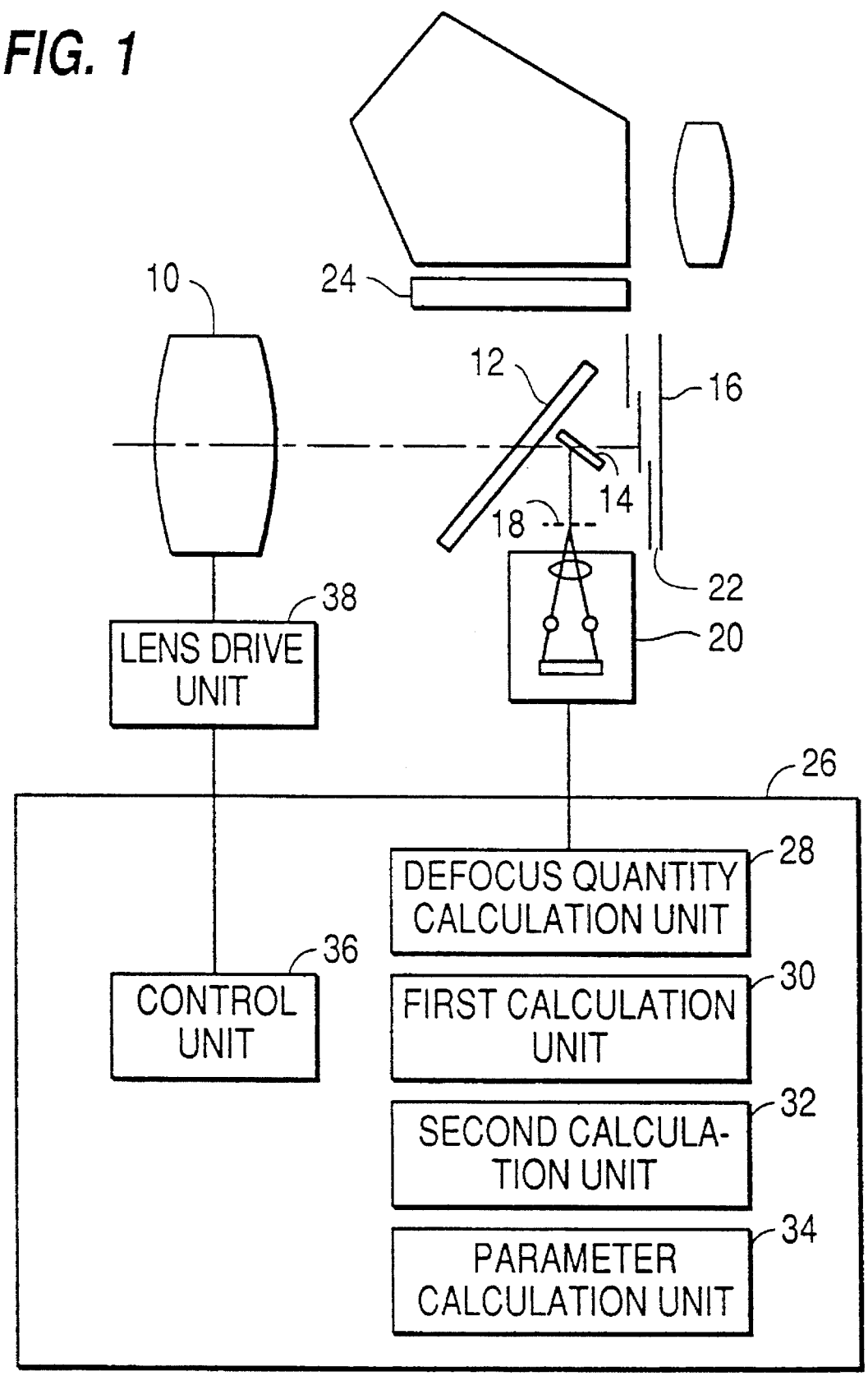
FIG. 1 is a block diagram showing a system for detecting and predicting field movement speed and for predicting a future field position in accordance with a first embodiment of the present invention.

FIG. 1 is a block diagram of a system for detecting and predicting field movement speed and for predicting a future field position using focus detection results in accordance with a first embodiment of the present invention. As seen in FIG. 1, a light beam passes through a photographic lens 10, on through a semi-transparent portion of a quick-return mirror 12, and is reflected, by means of a sub-mirror 14, into a focus detection block 20. The quick-return mirror 12 and the sub-mirror 14 may be shifted upward to a direction beneath a screen matt 24. When the quick-return mirror 12 and the sub-mirror 14 are shifted upward, a shutter 22 is opened for an exposure period by a shutter control unit (not shown), and photographic film 16 is exposed. The focus detection block 20 includes a well-known split pupil imaging optical system and paired image sensors which store image information. The image information stored by the image sensors is sent in intermittent cycles to a microcomputer 26.

The microcomputer 26 includes a defocus quantity calculation unit 28 which intermittently outputs a defocus quantity indicating the relative displacement of an imaging surface of the photographic lens 10 from a focus detection surface 18 (predetermined detection surface). A first calculation unit 30 calculates a first quantity related to a speed of movement of a photographic subject based upon the defocus quantities output from defocus quantity calculation unit 28 over a time range which is longer than a predetermined time period. A second calculation unit 32 calculates a second quantity related to the speed of movement of the photographic subject based upon the defocus quantities output over a time range which is shorter than the predetermined time period.

A parameter calculation unit 34 calculates parameters for decision on the appropriateness of the first and second quantities. Specifically, the parameter calculation unit 34 outputs parameters which determine whether the first quantity or the second quantity is a better indication of a predicted field movement speed. A control unit 36 controls a lens drive unit 38 in order to adjust the focus of the photographic lens 10 so as to correct for the movement of the field position accompanying the movement of the photographic subject based on the calculated first and second quantities and the calculated parameters. More specifically, the movement of the field position may be corrected based upon a selection of either the first quantity or the second quantity, dependent on the calculated parameters, or the movement of the field position may be corrected based upon a combination of the first and second quantities, dependent on the calculated parameters.

The lens drive unit 38 moves the photographic lens 10 by an amount indicated by the control unit 36. Further, the lens drive unit 38 includes, in addition to a drive motor member, a well-known monitoring member which generates feedback pulses showing the actual extent of movement of the photographic lens 10. These feedback pulses are normally transmitted to the microcomputer 26.

Figure 2:
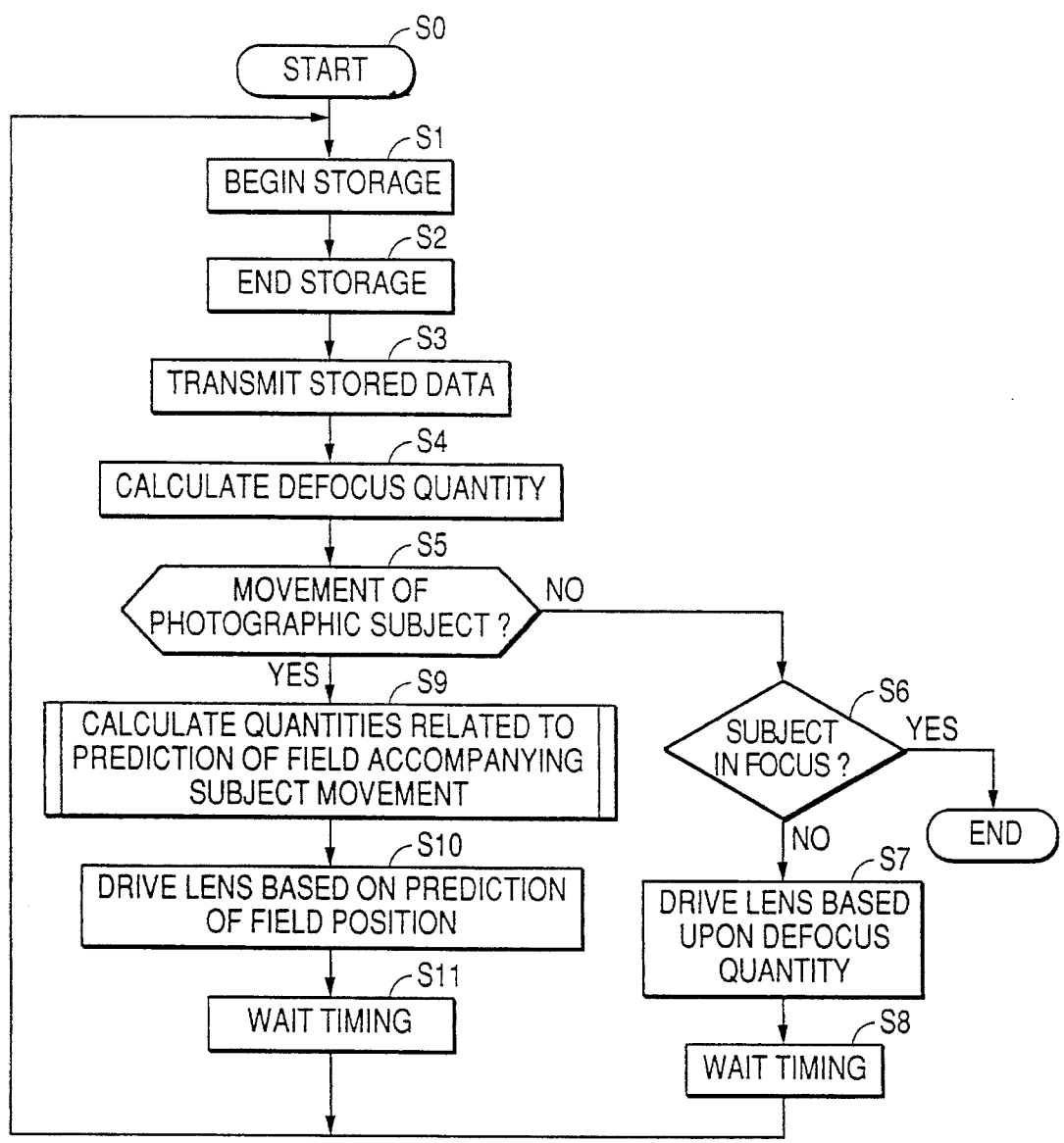
FIG. 2 is a flowchart illustrating a process for performing focus adjustment according to a predicted field position.

FIG. 2 is a flowchart showing a process for predicting a future field position using focus detection results and for driving a photographic lens based upon the predicted field position according to the first embodiment of the present invention. Focus detection starts at step S0 when a release button (not shown) is half-depressed. In step S1, an indication of the beginning of storage of image information by the image sensors is emitted by the microcomputer 26, and an indication of the end of storage is emitted in step S2. It is possible that storage may automatically end due to built-in image sensor circuits dependent upon the brightness of the photographic subject, or due to an indication from the microcomputer 26. In either case, the end of storage is known to the microcomputer 26.

The storage time period for storage of image information varies according to the brightness of a photographic subject. The storage time period may vary from tens of microseconds to hundreds of milliseconds. The required storage time is represented by the time from commencement of storage in step S1 to the end of storage in step S2. However, when the photographic lens 10 moves during the storage period, the true defocus quantity changes moment by moment. Therefore, in order to predict a future field position using defocus quantities, it is necessary to determine the instant during the storage time period which corresponds to a defocus quantity. An instant during the storage time period corresponding to a calculated defocus quantity is termed $t_n$.

When the storage time period is 10 milliseconds or less, the storage instant $t_n$ may be determined with reasonable preciseness. However, when a storage instant is required more precisely, the feedback pulses generated by the lens drive unit 38 are monitored. Specifically, the feedback pulses which indicate the lens movement quantity from moment to moment from the commencement of storage to the end of storage, are monitored, so that, taking into consideration the change of lens movement speed, the instant of storage $t_n$ may be determined. Such a method for this step is known.

Figure 3:
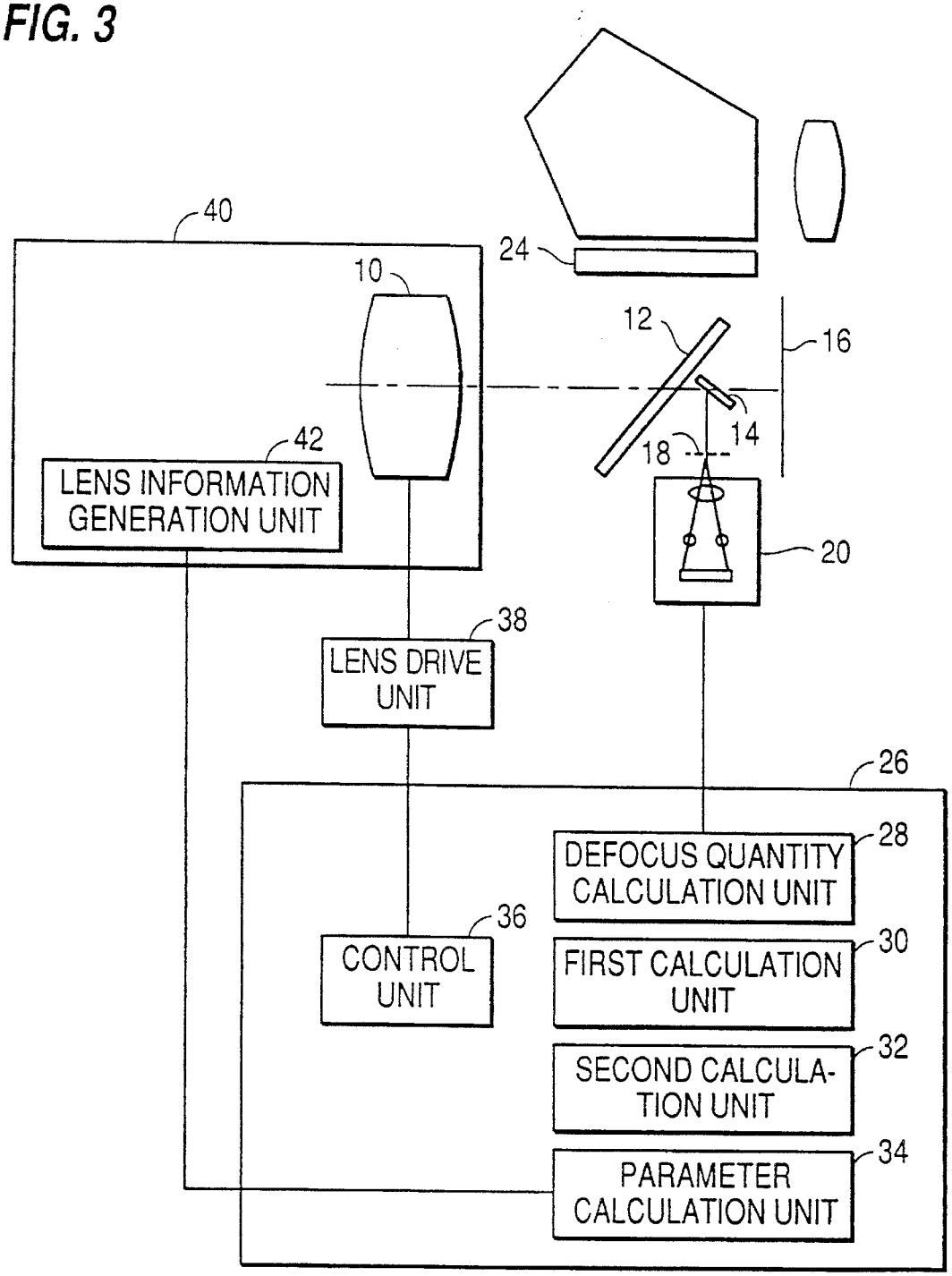
FIG. 3 is a block diagram of a system for detecting and predicting field movement speed and for determining a future field position which includes a lens information generation unit in accordance with the first embodiment of the present invention.

In order to simplify the following explanation, a description of the storage instant $t_n$ will be given, omitting a description of the storage time period. The microcomputer 26 knows the beginning of the storage time period and the end of the storage time period. Microcomputer 26 also gauges the feedback pulses generated by the lens drive unit 38 between the beginning and end of storage, and stores the storage instant $t_n$ corresponding to a calculated defocus quantity. The field movement quantity is determined by integrating the feedback pulses from the lens drive unit 38 with the storage instant $t_n$ as a starting point. When the lens movement quantity is not equal to the field movement quantity, one converted into the field movement quantity is used. It is well known that the calculation coefficients for the lens movement quantity and field movement quantity may be read out from a lens information generation unit 42 arranged in a photographic lens barrel 40, as shown in FIG. 3.

After the end of storage, in step S3 the stored image information is transmitted to the microcomputer 26 where it is stored. In step S4, the defocus quantity, representing the relative displacement of the predetermined detection surface 18 (conjugate to film surface 16 in FIG. 1) from the imaging surface of the photographic lens 10, is calculated by well-known methods in the defocus calculation unit 28 within the microcomputer 26.

Figure 4:
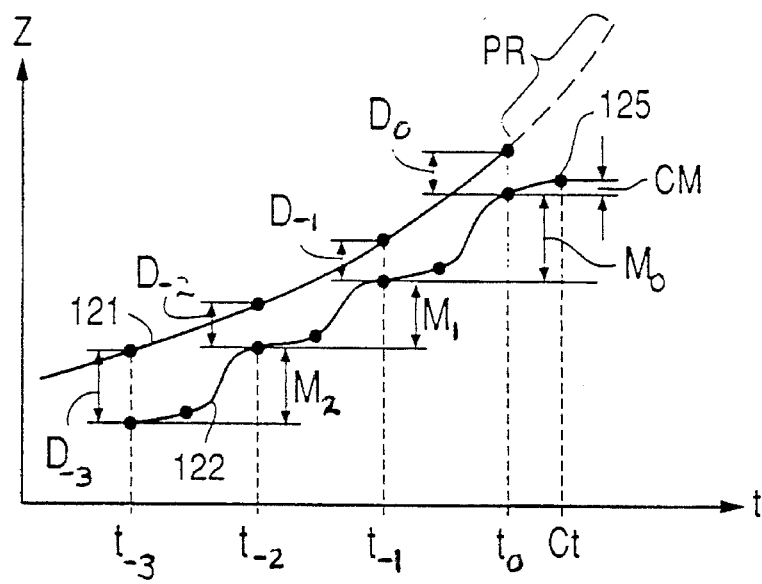
FIG. 4 is a graph illustrating the locus of movement of field position accompanying the movement of a photographic subject.

FIG. 4 is a graph showing the locus of movement of the photographic field position (curve 121) accompanying the movement of the photographic subject at storage times $t_n$, where n=−3, −2, −1, 0. Curve 122, which follows curve 121, shows the locus of movement of the predetermined detection surface 18. $D_n$ are the defocus quantities determined at storage instants $t_n$, and $M_n$ are the lens movement quantities from a previous storage instant $t_{n-1}$ to a present storage instant $t_n$. In actuality, the curves 121 and 122 become partially superposed and the defocus quantities $D_n$, corresponding to times $t_n$, become smaller. However, for ease of understanding the graph of FIG. 4, an interval is shown between the curves 121 and 122.

The defocus quantities $D_n$ corresponding to the storage instants $t_n$, and the photographic lens movement quantity $M_n$ from a storage instant $t_{n-1}$ one time previous, to a present storage instant $t_n$, are stored in memory as a data table, as shown in Table 1. According to this embodiment, data corresponding to three previous storage instants $t_{-3}$, $t_{-2}$, $t_{-1}$, in addition to the present storage instant $t_0$, are stored in memory. In general, a past predetermined number of storage instants $t_n$, and corresponding defocus quantities $D_n$ and lens movement quantities $M_n$ are stored in memory and not erased.

As shown in Table 2, the instant Ct, corresponds to the instant after the prediction calculation has ended (beginning of step S10) following the defocus calculation, and is the time point directly before drive commencement based on the new prediction. A quantity Cm corresponding to a lens movement quantity from a storage instant to the calculation end instant Ct is also stored. For example, when the image output corresponding to the storage time $t_0$ is used, at the instant $C_t$ when the calculation of the defocus quantity $D_0$ ends, $C_t$ and the photographic lens movement quantity $CM$, from the instant $t_0$ to $C_t$, are stored in memory as shown in Table 2. As stated previously, the time period for the prediction calculation has been ignored, and has been omitted from the above description.

TABLE 1

| STORAGE TIME | 3 TIMES BEFORE | 2 TIMES BEFORE | 1 TIME BEFORE | PRESENT TIME |
|---|---|---|---|---|
| n | −3 | −2 | −1 | 0 |
| Defocus quantity | $D_{-3}$ | $D_{-2}$ | $D_{-1}$ | $D_0$ |
| Storage time | $t_{-3}$ | $t_{-2}$ | $t_{-1}$ | $t_0$ |
| Lens movement quantity | $M_{-3}$ | $M_{-2}$ | $M_{-1}$ | $M_0$ |

TABLE 2

| Calculation End Instant | Present Time |
|---|---|
| Calculation end instant | $C_t$ |
| Lens movement quantity from storage instant to calculation end instant | $CM$ |

In step S5, it is determined whether or not the photographic subject has moved. In order to determine whether or not the subject has moved, a quantity of movement $P_n$ of the photographic field during a time interval $t_{n-1}$–$t_n$ is determined from the defocus quantities $D_n$, $D_{n-1}$ at two storage instants $t_n$, $t_{n-1}$, respectively, and from the lens movement quantity $M_n$ between these instants according to:

$$P_n = D_n + M_n - D_{n-1}. \tag{1}$$

Moreover, when the quantity of movement of the photographic field $P_n$ during the time interval $t_{n-1}$–$t_n$ is divided by the time elapsed during this time interval, the speed of movement of the photographic field $V_n$ is derived from the following equation:

$$V_n = P_n / (t_n - t_{n-1}). \tag{2}$$

When photographic field movement $P_n$ is due to photographic subject movement, the absolute values of $P_n$ and $V_n$ become large. Therefore, the situation in which the photographic field movement $P_n$ is due to photographic subject movement can be determined by comparing speed of field movement $V_n$ to a predetermined value. For example, setting $V_{th}$ as the predetermined value, when the inequality $$|V_n| > V_{th} \tag{3}$$

is satisfied, a determination is made that there is movement of the subject. In addition to the above-described method, various other methods are possible for determining whether or not there is subject movement. For example, the ratio of $P_n$ and $P_{n-1}$ may be used to determine subject movement. Such a method is known.

When no movement of the photographic subject is determined in Step S5, control proceeds to step S6 where it is determined whether or not the subject is in focus by determining whether the magnitude of the defocus quantity $D_n$ is less than a predetermined quantity $$|D_n| < D_{th}. \tag{4}$$

When the condition set forth in (4) above is satisfied, the photographic lens 10 is in a focused state, and the lens drive operation is ended. However, when the magnitude of the defocus quantity $D_n$ is larger than the predetermined value $D_{th}$, and (4) is not satisfied, in step S7 the photographic lens 10 is driven based on the defocus quantity $D_n$. The end of lens drive is performed, by a well-known method not shown in the figure, upon receiving a signal from an interrupt generation means.

In step S8, a wait timing operation is performed depending on the lens drive control method used. Two lens drive control methods are possible based upon whether or not lens drive and storage are simultaneously performed. Specifically, if control returns to step S1 after waiting until the end of lens drive, a so-called intermittent drive has been performed. If control returns to step S1 without waiting until the end of lens drive, a so-called overlap drive has been performed.

Proceeding to step S9, when it has been determined in step S5 that there is subject movement, a quantity is calculated relating to the prediction of the photographic field accompanying the subject movement. Step S9 provides a feature of the present invention by which accurate prediction of the field position is made, as seen in PR of FIG. 4, partially using the data of Table 1 and Table 2, as will be described in detail later.

Figure 5:
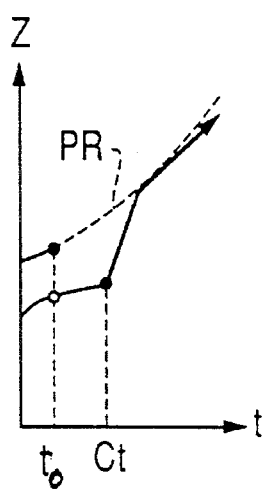
FIG. 5 is a graph illustrating a method for driving a lens according to a predicted field position.
Figure 6:
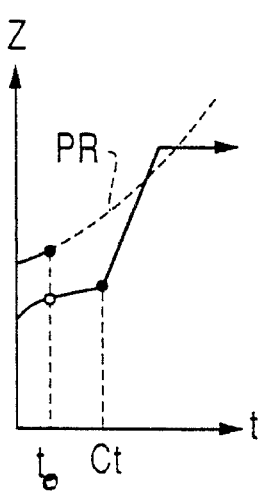
FIG. 6 is a graph illustrating a method for driving a lens according to a predicted field position.
Figure 7:
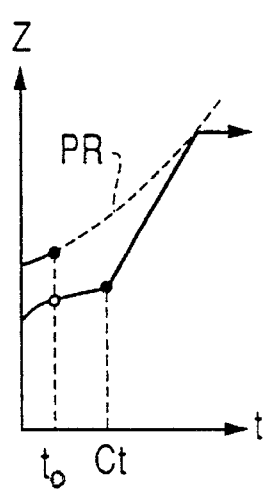
FIG. 7 is a graph illustrating a method for driving a lens according to a predicted field position.

Next, in step S10, drive of the photographic lens 10 is commenced, based on the predicted field position determined in step S9. Various methods for effecting lens drive are possible, as shown in FIGS. 5–7. For example, as seen in FIG. 5, the lens is driven close to the prediction locus PR at high speed, and is then driven along the prediction locus PR. In the method shown in FIG. 6, the lens is driven to slightly overrun the prediction locus PR, then it is stopped while waiting for the prediction locus PR to overtake at a predetermined instant. And, as seen in FIG. 7, the lens is driven so as to agree with the prediction locus PR at a predetermined instant. In addition to the above-described drive methods, other optional lens drive methods may be suitable for driving the lens as a result of a prediction according to the present invention. Lens driving is stopped according to a well-known method, not shown in the drawing, wherein a signal is received from an interrupt generation means. In step S11, a wait timing operation is performed depending upon the lens drive control method used. As described previously, two control methods are possible according to whether or not lens drive and storage are performed simultaneously. Specifically, if control returns to step S1 after waiting until the end of lens drive, a so-called intermittent drive has been performed. If control returns to step S1 without waiting for the end of lens drive, a so-called overlap drive has been performed.

Figure 8:
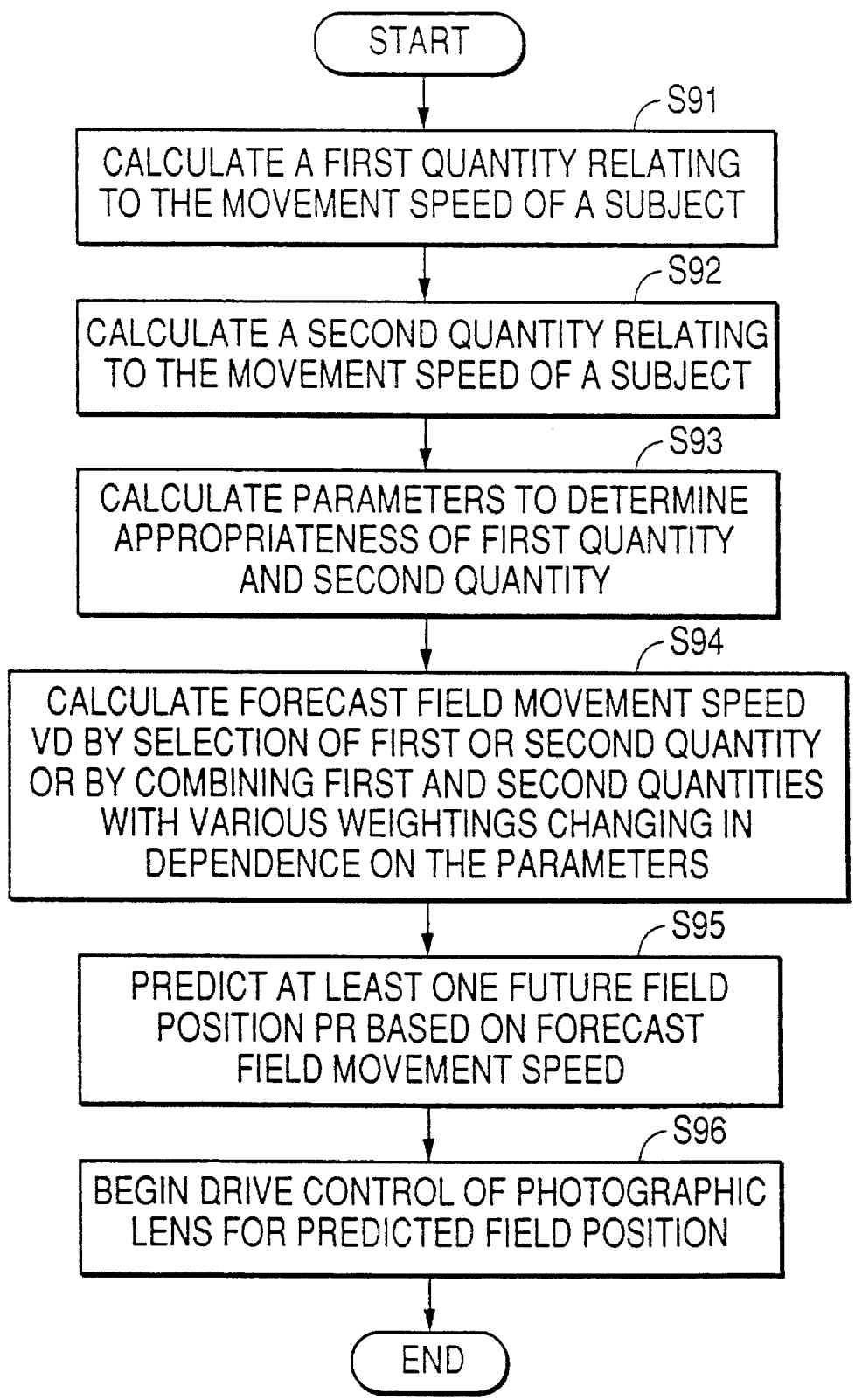
FIG. 8 is a flowchart showing a method for controlling the drive of a photographic lens based upon a predicted future field position.

Now, referring to FIG. 8, a procedure for predicting the future field position, corresponding to step S9 in FIG. 2, will be described. FIG. 8 is a flowchart detailing the steps involved in determining quantities for predicting a future field position. In step S91, a first quantity VD1, related to the speed of movement of the photographic subject, is calculated based upon data taken at storage instants during a time interval which is longer than a predetermined time $T_{th}$. The first quantity VD1 is calculated by the first calculation unit 30 shown in FIG. 1. Specifically, when a time interval $t_0 - t_{-3} > T_{th}$ is used, the first quantity VD1 is calculated according to the equation:

$$VD1 = (D_0 + M_0 + M_{-1} + M_{-2} - D_{-3})/(t_0 - t_{-3}). \tag{5}$$

Next, in step S92, a second quantity VD2 relating to the speed of movement of the photographic subject is calculated based upon data taken at storage instants during a time interval which is shorter than the predetermined time $T_{th}$. The second quantity VD2 is calculated by the second calculation unit 32 shown in FIG. 1. Specifically, when the time interval $t_0-t_{-1}<T_{th}$ is used, the second quantity VD2 is calculated according to the equation:

$$VD2=(D_0+M_0-D_{-1})/(t_0-t_{-1}). \quad (6)$$

Proceeding to step S93, the parameter calculation unit 34, shown in FIG. 1, calculates parameters in order to determine the appropriateness of the calculated first quantity VD1 and the second quantity VD2 with respect to selection of VD1 or VD2 as the speed of field movement. Next, in step S94, a forecast field movement speed VD is determined by selecting either VD1 or VD2, or by determining various weights to be assigned VD1 and VD2, dependent upon the calculated parameters, and combining the first quantity VD1 and the second VD2, subject to the various weights, in order to calculate the predicted field movement speed VD.

Figure 9:
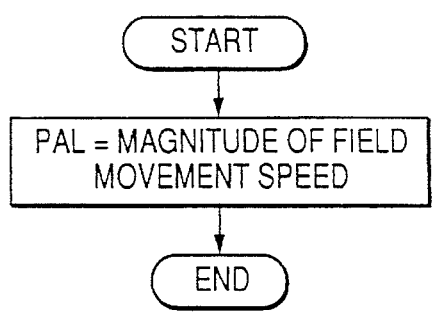
FIG. 9 is a flowchart showing a method for determining parameters used to predict future field position.

Various examples of methods for determining the calculated parameters and the forecast movement speed VD, as set forth in steps S93 and S94, respectively, will be described below. For example, as seen in FIG. 9, a parameter PAL may be set equal to the magnitude of the field movement speed, preferably the latest magnitude of the field movement speed (i.e., the field movement speed determined during the interval $t_{-1}-t_0$), according to the equation:

$$PAL=|(D_0+M_0-D_{-1})/(t_0-t_{-1})|. \quad (7)$$

The parameter PAL may then be compared with a constant PAL1, which is a predetermined constant signifying a small image movement speed. When the inequality $$PAL<PAL1 \quad (8)$$

is satisfied, the forecast field movement speed VD is set equal to the first quantity VD1, calculated according to equation (5) based upon a long period $t_0-t_{-3}$, $$VD=VD1. \quad (9)$$

Alternatively, when PAL does not satisfy the inequality expressed in (8), the forecast movement speed VD is set equal to the second quantity VD2 calculated according to equation (6) based upon a short time period $t_0-t_{-1}$, $$VD=VD2. \quad (10)$$

Figure 10:
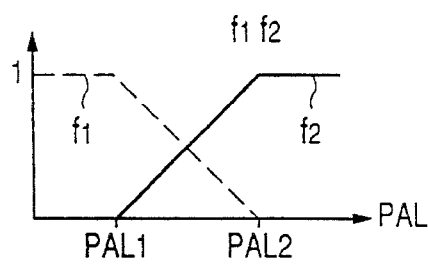
FIG. 10 is a graph showing a function defining selected weighting coefficients.

A second example of a method for calculating the forecast field movement speed VD includes combining the first quantity VD1 and the second quantity VD2 after varying these quantities by assigning them different weights dependent on the parameter PAL. More specifically, PAL is determined in a manner similar to the first example using equation (7). The weighting coefficients f1(PAL) and f2(PAL) are defined, as shown in FIG. 10, varying dependent upon the magnitude of PAL. The forecast field movement speed VD, obtained by combining VD1 and VD2 according to weighting coefficients f1 and f2, is determined by the equation:

$$VD=f1 \cdot VD1+f2 \cdot VD2. \quad (11)$$

Figure 11:
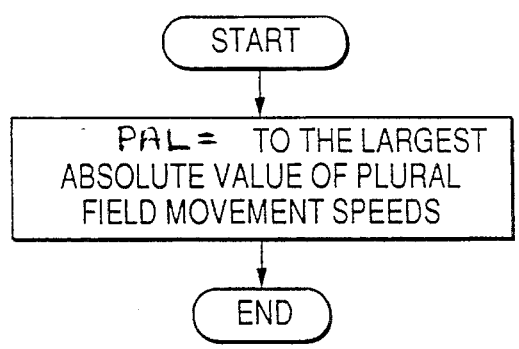
FIG. 11 is a flowchart showing a method for determining parameters used to predict future field position.
Figure 12:
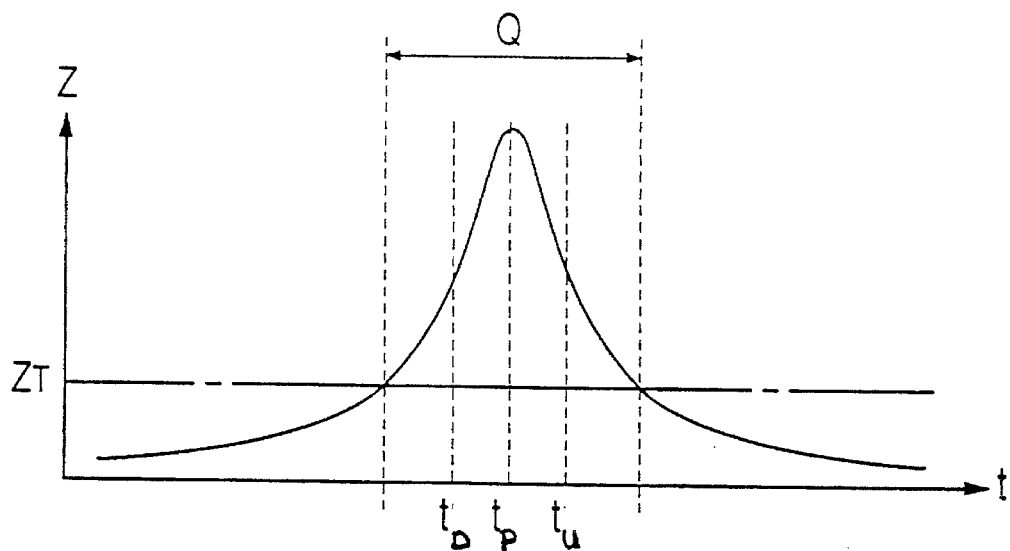
FIG. 12 is a graph illustrating the change in field position with respect to time for an object moving from far to near opposite a photographic lens.
Figure 13:
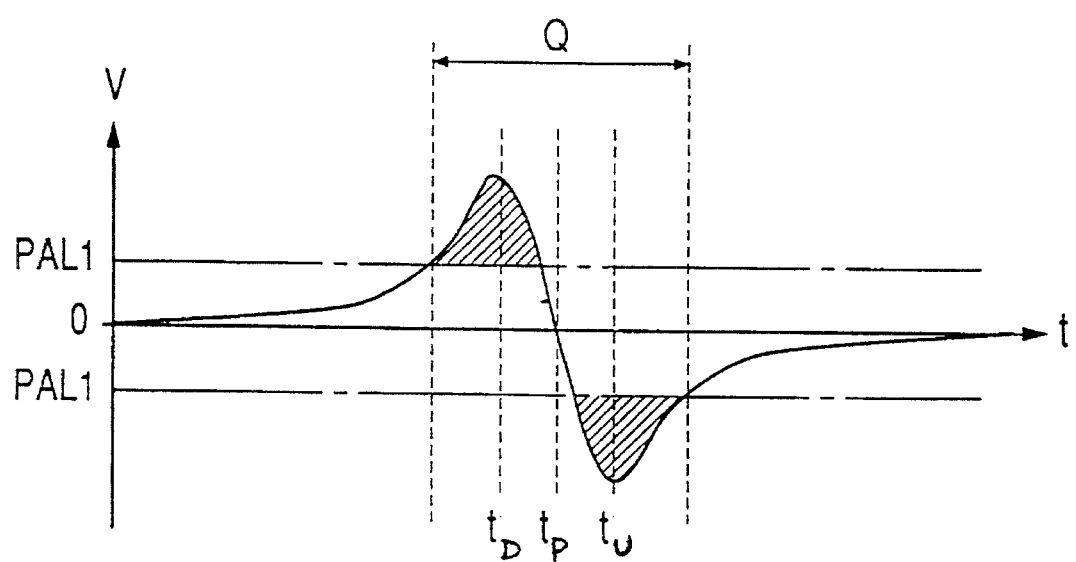
FIG. 13 is a graph illustrating the change in field movement speed with respect to time for the object graphed in FIG. 12.

FIG. 11 shows a third example of a method for calculating the forecast movement speed VD when the change in field movement speed is sudden by taking plural storage instants close in time. For example, FIG. 12 shows a graph of field position Z with respect to time t for an object moving from far to near relative to a photographic lens. FIG. 13 shows the change in field movement speed with respect to time for the object movement shown in FIG. 12. The region Q in each of FIGS. 12 and 13 corresponds to a region of sudden change in field movement speed. By comparing the absolute value of field movement speed |V| to a predetermined value, the region Q of sudden change can be determined. According to the method shown in FIG. 11, plural field movement speeds are determined and the parameter PAL is set equal to the largest absolute value of the plural field movement speeds. For example, the first quantity VD1 and the second quantity VD2 may be used, unaltered, as the plural field movement speeds. As seen in FIG. 13, by comparing PAL to a predetermined value PAL1 the region Q of sudden change in field movement speed may be determined. Using the larger value among plural field movement speeds to represent different instants close in time, as seen at the point $t_p$ in FIG. 13, field movement speed instantaneously becomes 0 in the vicinity of the point $t_p$. According to the third example, the method for determining VD may be similar to that described in the first example or that described in the second example.

Figure 14:
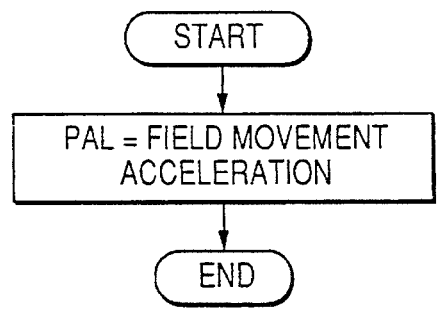
FIG. 14 is a flowchart illustrating a method for determining parameters used to predict future field position.

FIG. 14 shows a fourth example of a method for determining the parameter PAL and the forecast field movement speed VD. The parameter PAL is set equal to a quantity relating to the field movement acceleration, for example, according to the equation:

$$PAL=\{(D_0+M_0-D_{-1})/(t_0-t_{-1})\}-\{(D_{-1}+M_{-1}-D_{-2})/(t_{-1}-t_{-2})\}. \quad (12)$$

Figure 17:
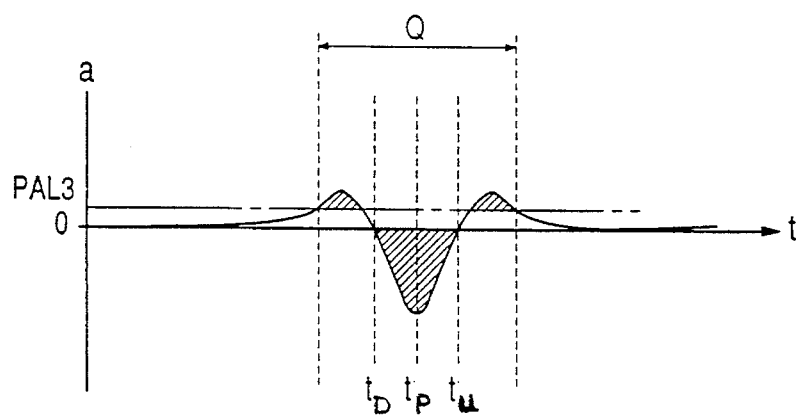
FIG. 17 is a graph illustrating the change in field movement acceleration with respect to time for the object graphed in FIG. 12.

PAL3 is a predetermined constant, as seen in FIG. 17, signifying the condition when the change in field movement acceleration is small. When the inequality $$PAL3>PAL\geq0-(\text{a small error portion}) \quad (13)$$

is satisfied, field movement speed based on the long time period VD1 is adopted as the forecast field movement speed VD, $$VD=VD1. \quad (14)$$

When PAL does not satisfy the inequality expressed in (13), the field movement speed based on the short time period VD2 is adopted as the forecast field movement speed VD, $$VD=VD2. \quad (15)$$

Figure 15:
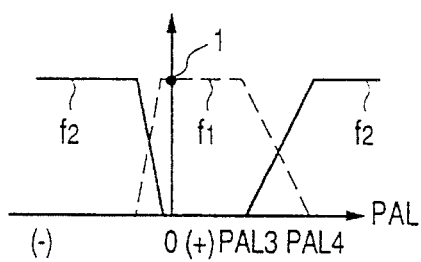
FIG. 15 is a graph showing a function defining selected weighting coefficients.

FIG. 15 illustrates a fifth example of a method for determining parameter PAL and forecast field movement speed VD. After PAL is determined in a manner similar to the fourth example described above (equation (12)), various weighting coefficients f1(PAL) and f2(PAL) are defined which vary in dependence upon the parameter PAL. As seen in FIG. 15, the weighting coefficients f1(PAL) and f2(PAL) are defined to vary in dependence upon the magnitude of PAL. The forecast field movement speed VD is determined by combining weighted values of VD1 and VD2 in the manner shown in equation (11).

Figure 16:
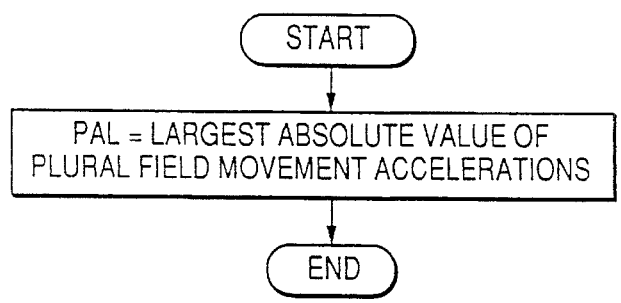
FIG. 16 is a flowchart illustrating a method for determining parameters used to predict future field position.

FIG. 16 shows a sixth example of a method for determining parameter PAL and forecast field movement speed VD. Specifically, plural field movement accelerations are determined and PAL is set equal to the largest absolute value of the plural field movement accelerations. According to this method, the large values among plural field movement accelerations are used to represent different instants close in time. As seen in FIG. 17, even though $t_D$ and $t_U$ are close in time, because large values among plural image movement accelerations are used to determine instants representing plural image movement accelerations, it is correctly determined that $t_D$ and $t_U$ are within a region Q of sudden change of field movement. According to this example, the method for determining forecast field movement speed VD may be similar to the fourth example or similar to the fifth example, as described above.

Figure 18:
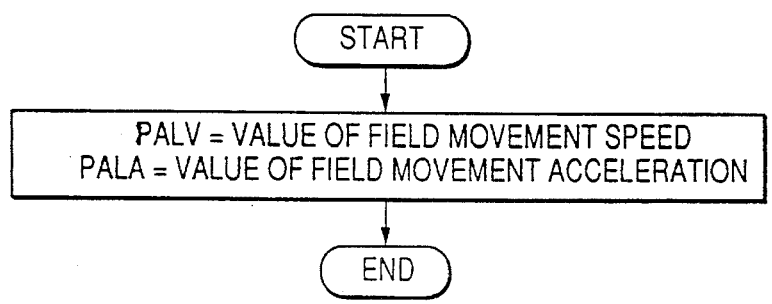
FIG. 18 is a flowchart illustrating a method for determining parameters used to predict future field position.

FIG. 18 shows a seventh example of a method for determining the parameter PAL and the forecast field movement speed VD. In FIG. 18, both the field movement speed and the field movement acceleration are used. Specifically, a parameter PALV relating to the field movement speed is determined according to the equation:

$$PALV=(D_0+M_0-D_{-1})/(t_0-t_{-1}), \tag{16}$$

and a parameter relating to the value of the field movement acceleration PALA is determined according to the equation:

$$PALA=\{(D_0+M_0-D_{-1})/(t_0-t_{-1})\}-\{(D_{-1}+M_{-1}-D_{-2})/(t_{-1}-t_{-2})\}. \tag{17}$$

Figure 19:
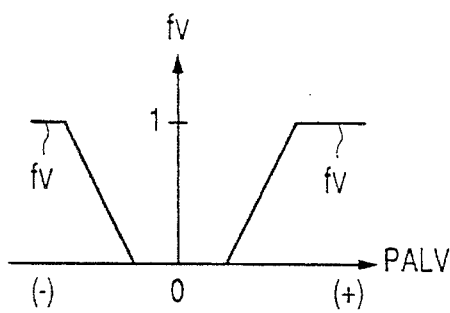
FIG. 19 is a graph showing a function defining selected weighting coefficients.
Figure 20:
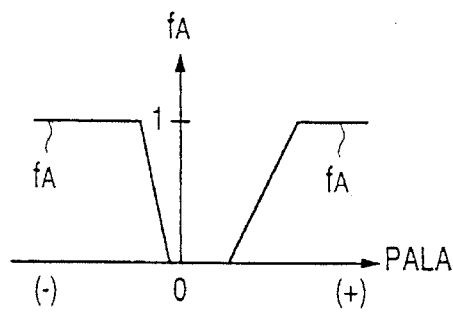
FIG. 20 is a graph showing a function defining selected weighting coefficients.

Weighting coefficients fV and fA corresponding to the parameters PALV and PALA, respectively, are defined as shown in FIG. 19 and FIG. 20, and a coefficient f corresponding to these weighting coefficients fV and FA is defined by the equation:

$$f=MAX(fV, fA). \tag{18}$$

MAX (X, Y) indicates the value of the larger of X and Y. When the value f is 0, it indicates a region where the change in field movement speed is small. When the value of f is 1, it indicates a region where the change in field movement speed is very large. Between the two regions, there is an intermediate region, and in this region, if a weighted combination of both VD1 and VD2 is determined, a combined forecast field movement speed VD is obtained according to the equation:

$$VD=(1-f)\cdot VD1+f\cdot VD2. \tag{19}$$

Returning to FIG. 8, in step S95, using the forecast field movement speed VD, calculated according to any of the various methods described above, at least one future field position (PR in FIG. 4) is predicted. For example, the predicted field position ZCT (Δt) a small time Δt after the instant Ct, based on the position 125 of the lens at the instant Ct, is calculated according to the equation:

$$ZCT(\Delta t)=D_0+VD\cdot(Ct-t_0)-CM+VD\cdot \Delta t. \tag{20}$$

Continuing, in step S96, drive control for the photographic lens 10 is commenced for the above-described predicted field position. The specific methods used for driving the photographic lens 10 may be those described above with respect to FIGS. 5–7. Alternatively, the lens may be driven according to any of the various well-known methods.

In the above-described examples, the forecast field movement speed has been found in dependence on the calculated parameters. Based on the forecast field movement speed, the predicted field position has been determined. However, when there are plural predicted field positions, a method, as shown in FIG. 21, is required for selecting or combining the plural predicted field positions in dependence on the calculated parameters.

Figure 21:
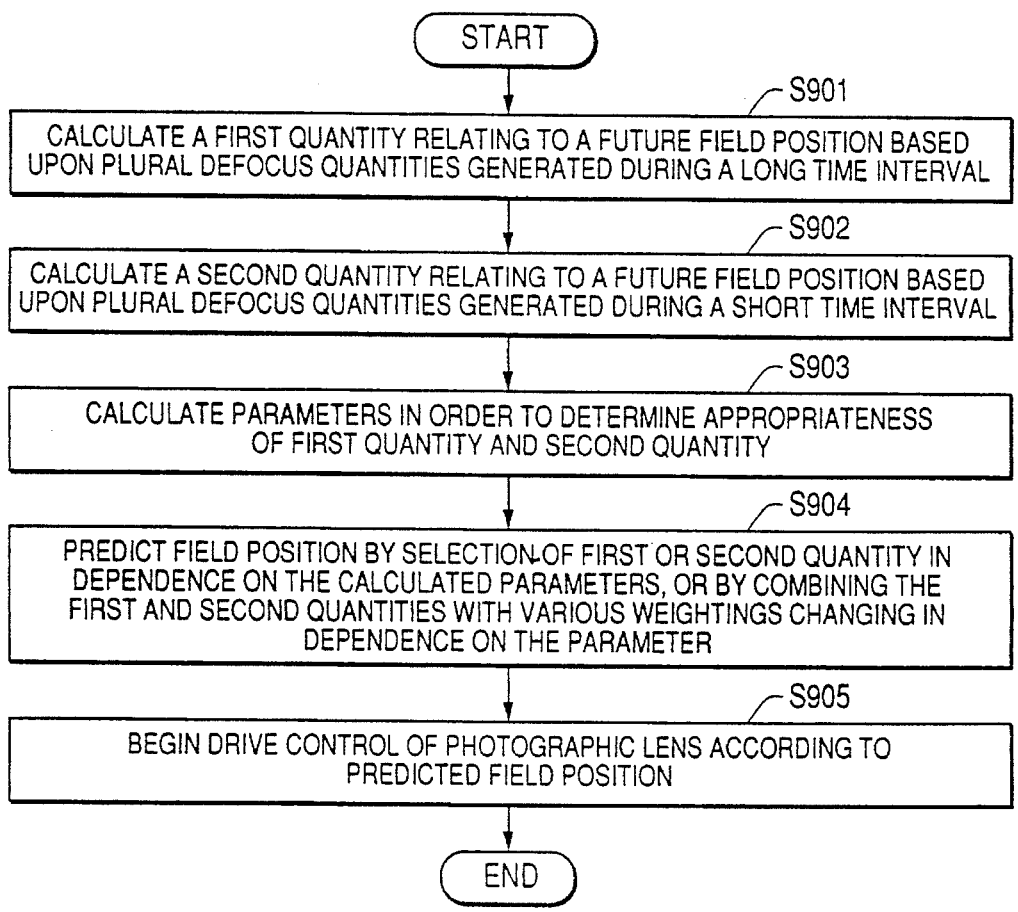
FIG. 21 is a flowchart showing a method for controlling the drive of a photographic lens based upon a predicted future field position.

Referring now to FIG. 21, a flowchart showing a method for selecting or combining plural predicted field positions is illustrated. In step S901, based upon plural defocus quantities generated during a longer time range than the predetermined time $T_{th}$, a first quantity relating to the future field position is calculated. Specifically, when $t_0-t_{-3}>T_{th}$, using VD1 determined according to the equation:

$$VD1=(D_0+M_0+M_{-1}+M_{-2}-D_{-3})/(t_0-t_{-3}), \tag{21}$$

a future field position (PR of FIG. 4) is predicted. For example, a first quantity ZCTL (Δt), which represents a predicted field position at a time Δt after the instant Ct based on defocus quantities taken during a long time range, is determined according to the equation:

$$ZCTL(\Delta t)=D_0+VD1\cdot(Ct-t_0)-CM+ VD1\cdot \Delta t. \tag{22}$$

Next, in step S902, based on plural defocus quantities generated during a shorter time than the predetermined time $T_{th}$, a second quantity relating to the future field position is calculated. Specifically, when $t_0-t_{-1}<T_{th}$, using VD2 determined according to the equation:

$$VD2=(D_0+M_0-D_{-1})/(t_0-t_{-1}), \tag{23}$$

a future field position (PR in FIG. 4) is predicted. For example, a second quantity ZCTS (Δt) which represents a predicted field position at a time Δt after the instant Ct based on defocus quantities taken during a short time range, is determined according to the equation:

$$ZCTS(\Delta t)=D_0+VD2\cdot(Ct-t_0)-CM+ VD2\cdot \Delta t. \tag{24}$$

According to the above-description, data at any two instants was used in determining the first quantity ZCTL and the second quantity ZCTS as the future field positions. However, it will be recognized that by means of well-known methods a prediction may similarly be made according to a secondary expression using the data for three instants, and furthermore, predictions may be made according to higher order expressions using the data for many instants.

Next, in step S903, parameters are calculated in order to determine the suitability of the first quantity ZCTL and the second quantity ZCTS. In step S904, dependent upon the calculated parameters, either of the first quantity ZCTL or the second quantity ZCTS may be selected. Alternatively, various weights may be assigned to the first and second quantities dependent upon the calculated parameters, and the first quantity and the second quantity may be combined in order to determine the future field position ZCT (Δt). Some specific examples of the parameter calculating step S903 and the field position prediction step S904 are described below.

EXAMPLE 2-1

As shown in FIG. 9, the parameter PAL is set equal to the magnitude of the field movement speed, preferably the latest field movement speed. For example, $$PAL=|(D_0+M_0-D_{-1})/(t_0-t_{-})|. \tag{25}$$

PAL1 is a predetermined constant which signifies that the field movement speed is small. When the inequality $$PAL<PAL1 \tag{26}$$

is satisfied, a predicted value is adopted based on the plural defocus quantities taken during the long period, and $$ZCT(\Delta t)=ZCTL(\Delta t). \tag{27}$$

However, when PAL does not satisfy the inequality (26), a predicted value is adopted based on the plural defocus quantities taken during the small time period $$ZCT(\Delta t)=ZCTS(\Delta t). \tag{28}$$

EXAMPLE 2-2

In this example, after PAL has been found in a manner similar to Example 2-1 (equation (25)), the first quantity ZCTL and the second quantity ZCTS are assigned various weights, as shown in FIG. 10, dependent upon the parameter PAL. The weighting functions f1(PAL) and f2(PAL) are defined in a manner similar to FIG. 10, and change dependent upon the magnitude of PAL. Thus, the predicted future field position is calculated by combining the predicted field positions ZCTL and ZCTS assigned various weighting functions according to the equation:

$$ZCT(\Delta t) = f1 \cdot ZCTL(\Delta t) + f2 \cdot ZCTS(\Delta t). \tag{29}$$

EXAMPLE 2-3

According to this example, the parameter PAL is determined in a manner similar to that shown in FIG. 11. Plural field movement speeds are determined, and the largest absolute value of the plural field movement speeds is set as the value of PAL. By taking the magnitude of field movement speeds at different instants which are close in time, the value of the magnitude of the field movement speed at $t_p$ of FIG. 13 is also included, so that it can be correctly determined that it is in region Q of sudden change of field speed.

The method for finding the predicted future field position ZCT ($\Delta t$) in this example may be similar to that described in Example 2-1 and Example 2-2.

EXAMPLE 2-4

As shown in FIG. 14, the parameter PAL is set equal to the field movement acceleration, and preferably the latest field movement acceleration is used. For example, $$PAL = \{(D_0 + M_0 - D_{-1})/(t_0 - t_{-1})\} - \{(D_{-1} + M_{-1} D_{-2})/(t_{-1} - t_{-2})\}. \tag{30}$$

PAL3 is a predetermined constant signifying that the field movement acceleration is small. When the inequality $$PAL3 > PAL \geq 0 - (\text{a very small error quantity}) \tag{31}$$

is satisfied, a predicted value of the future field position ZCT ($\Delta t$) is adopted based upon plural defocus quantities generated over a long time period according to:

$$ZCT(\Delta t) = ZCTL(\Delta t). \tag{32}$$

When PAL does not satisfy the inequality (31), the future field position ZCT ($\Delta t$) is set equal to the predicted field position based upon plural defocus quantities generated over a small time period $$ZCT(\Delta t) = ZCTS(\Delta t). \tag{33}$$

EXAMPLE 2-5

After determining PAL as in Example 2-4 (equation (30)), the first quantity ZCTL and the second quantity ZCTS are assigned various weights dependent upon the parameter PAL and are then combined. The weighting functions f1(PAL) and f2(PAL) are defined in a manner similar to FIG. 15, and the weighting functions change dependent upon the magnitude of PAL. The predicted future field position ZCT ($\Delta t$) based on the combined values of ZCTL and ZCTS is determined according to the equation:

$$ZCT(\Delta t) = f1 \cdot ZCTL(\Delta t) + f2 \cdot ZCTS(\Delta t). \tag{34}$$

EXAMPLE 2-6

PAL is determined in a manner similar to that shown in FIG. 16, where plural field movement accelerations are determined and the largest absolute value of the plural field movement accelerations set as the value of PAL. By taking the magnitude of the plural field movement accelerations at different instants which are close together in time, the value of the magnitude of the field movement speed in the vicinity of the points $t_D$ and $t_u$ of FIG. 17 is also included, so that it can be correctly determined that it is in a region Q of sudden change of field acceleration.

According to this example, the method for determining ZCT ($\Delta t$) may be similar to that described in Example 2-4 and Example 2-5, above.

EXAMPLE 2-7

Parameters relating to both the field movement speed and the field movement acceleration are determined. As seen in FIG. 18, a parameter PALV is set to the value of the field movement speed according to:

$$PALV = (D_0 + M_0 - D_{-1})/(t_0 - t_{-1}), \tag{35}$$

and a parameter PALA is set to the value of the field movement acceleration according to:

$$PALA = \{(D_0 + M_0 - D_{-1})/(t_0 - t_{-1})\} - \{(D_{-1} + M_{-1} - D_{-2})/(t_{-1} - t_{-2})\}. \tag{36}$$

Weighting coefficients fV and fA corresponding to the parameters PALV and PALA, respectively, are defined as shown in FIGS. 19 and 20, and a coefficient f related to the weighting functions FA and FV is defined by:

$$f = MAX(fV, fA). \tag{37}$$

MAX (X, Y) indicates the value of the larger of X and Y. When the value of f is 0, this indicates a region in which the change of field movement speed is small. When the value of f is 1, this indicates a region in which the change of field movement speed is very large. The future field position ZCT ($\Delta t$) based upon the combination of ZCTL and ZCTS, each weighted according to fV and fA, is determined by the equation:

$$ZCT(\Delta t) = (1-f) \cdot ZCTL(\Delta t) + f \cdot ZCTS(\Delta t). \tag{38}$$

In step S905, drive control of the photographic lens 10 is commenced for the field position predicted according to the above-described methods. The specific manner of moving the lens may be as described above in connection with FIGS. 5–7, or any of the various well-known methods may be used.

According to the embodiment described above, plural predictions were performed by methods which divide the defocus detection results used into those taken during to a long time period, and those taken during a short time period relative to a predetermined time period $T_{th}$. However, plural predictions may be performed by subdividing the range of data by the number of times of intermittently repeated focus determination.

Moreover, in the embodiments described above, the field movement speed and the field movement acceleration calculated from plural defocus quantities have been described as parameters used for determining the appropriateness of the first quantity and of the second quantity. However, as is clear from FIG. 12, the period Q of sudden change in field movement speed, may cause problems when the photographic lens 10 images a subject separated by a predetermined quantity ZT or more from the field for an object at infinity. Accordingly, a quantity can be used for the parameter PAL which is related to the quantity by which the photographic lens is extended (image position Z with field for an object at infinity as the origin).

For example, the speed of the photographic subject which is the object of the predictive drive is generally 5 m/sec or more. Since, when the movement speed of the field is 1–2 mm/sec or more, the magnification of the photographic subject will be above about 50–70 times for a distant photographic subject, there is no necessity for a predicted drive. Furthermore, at a position where the change of field movement speed becomes sudden, if the field speed exceeds about 5 mm/sec, and the photographic magnification becomes 20–30 times, it can be assumed that the photographic subject is close.

Consequently, when the photographic magnification is greater than a predetermined value a prediction is performed based upon a long time interval. When the photographic magnification is smaller than a predetermined value, a prediction may be performed based upon the data relating to a short time interval, and the object of the present invention can still be basically achieved. The predetermined value $T_{th}$ may vary depending on the focal length of the photographic lens. Moreover, instead of calculating the photographic magnification position of a photographic lens on the basis of an infinitely distant lens position (or lens extension quantity or photographic subject distance corresponding to the infinitely distant lens position), data relating to a lens position corresponding to the position of an encoder, is stored within the photographic lens, and compared with a predetermined value. When the lens position is determined in the above-described manner, prediction is performed based on either data relating to a long time interval, or a prediction is performed based on data relating to a short time interval, in order to achieve the object of the present invention. In this case also, the predetermined value may depend on the focal length of the photographic lens.

Figure 22:
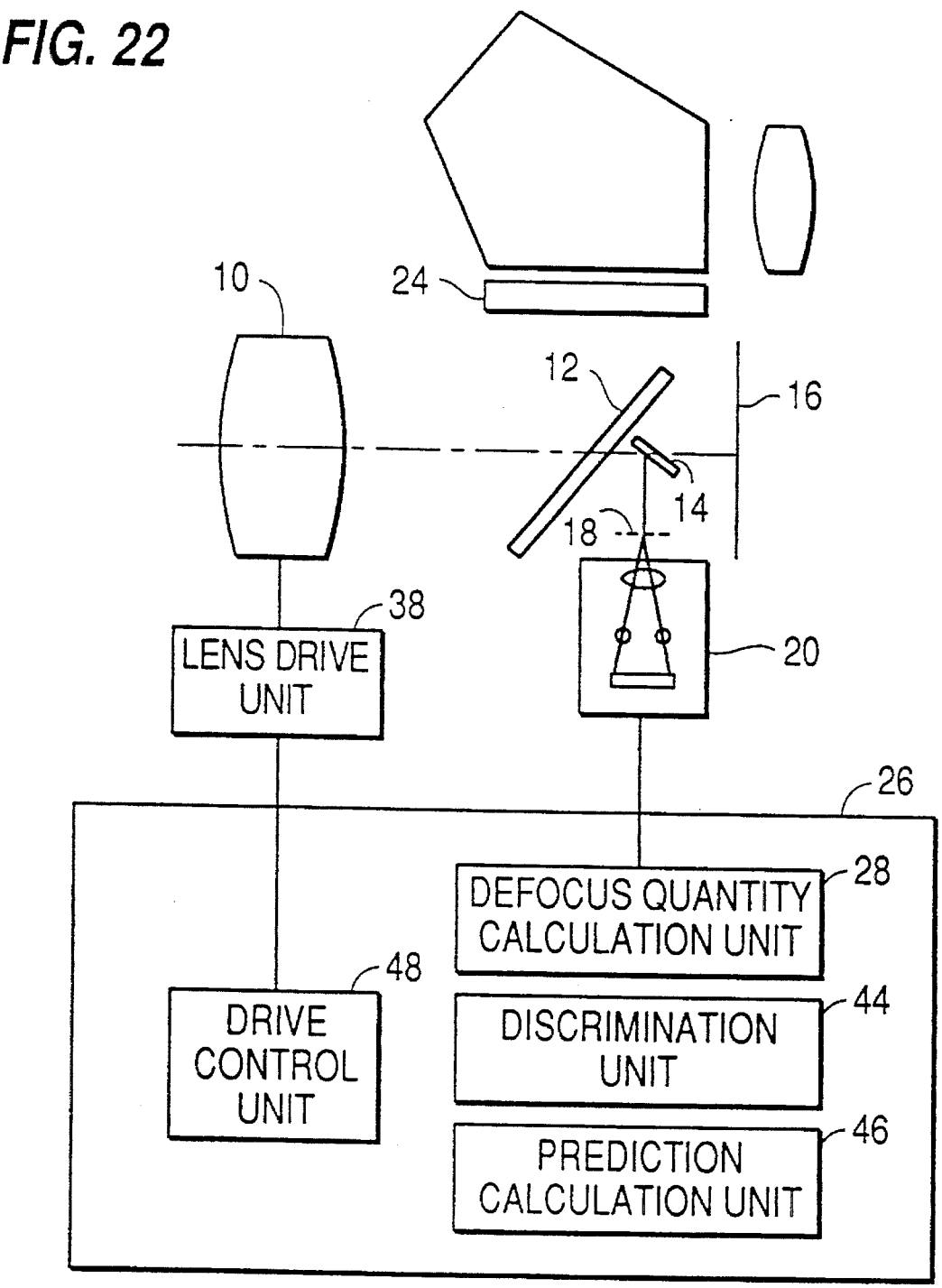
FIG. 22 is a block diagram of a system for detecting and predicting field movement speed and for predicting a future field position in accordance with a second embodiment of the present invention.

FIG. 22 shows a second embodiment of a focus detection device having a predictive function in accordance with the present invention. Like elements in the figures of the first and second embodiments have like reference numerals. Further, like elements operate in the same manner as described according to the first embodiment, and a description of those elements will not be repeated here.

The microcomputer 26 of the second embodiment includes a defocus quantity calculation unit 28, a discrimination unit 44 for discriminating whether or not the change of field movement speed accompanying the motion of a photographic subject is large or is assumed to be large, a prediction calculation unit 46 for modifying an equation of prediction calculation in order to predict future field position based on the result of the discrimination unit 44, and a drive control unit 48 to control lens drive unit 38 based on the result of the prediction calculation unit 46.

Figure 23:
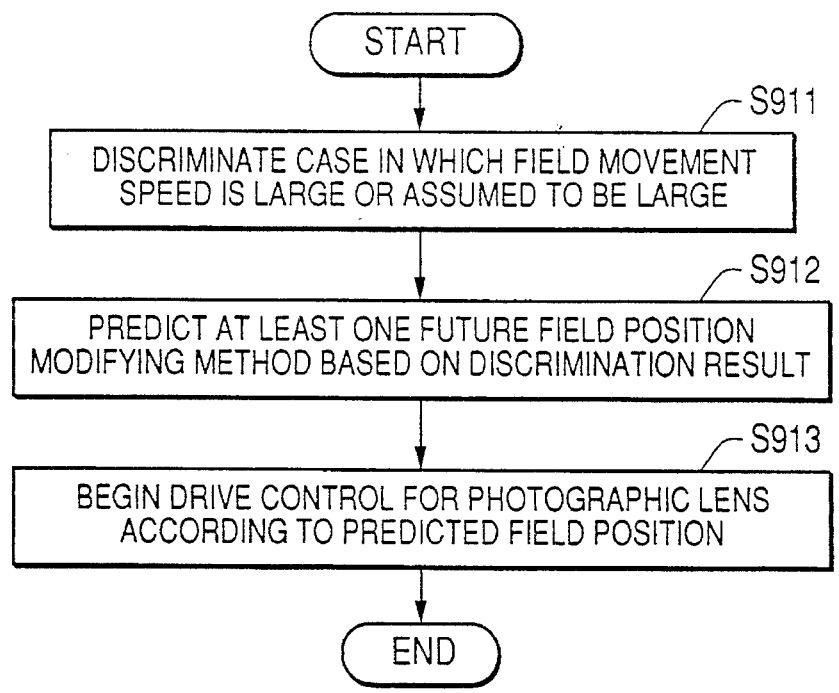
FIG. 23 is a flowchart showing a process for controlling drive of a photographic lens in accordance with a predicted field position.

Referring to FIG. 23, a method for determining the quantities for prediction of future field position, corresponding to step S9 in FIG. 2, will be described. The discrimination unit 44, may use various methods described up to this point for discriminating the case in which the field movement speed is large or assumed to be large. Specifically, methods using the field movement speed, methods using the photographic magnification, or methods using a combination of these, etc., can be applied.

In step S911, the discrimination unit 44 discriminates the case in which the field movement speed is large or assumed to be large. For example, the maximum magnitude of the determined plural field movement speeds may be used as the discrimination parameter PAL. The large field movement speed is used to represent different instants which are close in time. For example, $$PAL = MAX(|V_0|, |V_{-1}|), \quad (39)$$

or $$PAL = MAX(|V_0|, |V_{-2}|). \quad (40)$$

Where, $$V_0 = (D_0 + M_0 - D_{-1})/(t_0 - t_{-1}), \quad (41)$$

$$V_{-1} = (D_{-1} + M_{-1} - D_{-2})/(t_{-1} - t_{-2}), \text{ and}$$

$$V_{-2} = (D_{-2} + M_{-2} - D_{-3})/(t_{-2} - t_{-3}).$$

By comparing the magnitude of PAL with a predetermined value, the situation in which the field movement speed is large can be discriminated. For example, CASE 1: $PAL < 4$ (mm/sec), (42)
CASE 2: $4 \leq PAL < 8$ (mm/sec), and
CASE 3: $8 \leq PAL$ (mm/sec).

In step S912, based on the discrimination result determined in step S911, the method for predicting the future field position is modified and at least one future field position is predicted by prediction calculation unit 46.

Specifically, in CASE 1, where the field movement speed is slow, or the change of field movement speed is small, the future field position is predicted from plural data, including data separated by about 150 ms or more. In CASE 2, where the field movement speed or change in field movement speed is intermediate, the future field position is predicted from plural data, including data separated by about 50–70 ms. In CASE 3 where the field movement speed is large, or the change in field movement speed is sudden, the future field position is predicted from plural data, including data separated by an interval of about 50 ms or less.

Of course, depending upon the magnitude of PAL, the time interval of the data used may be more finely controlled. Furthermore, the time interval is determined in accordance with PAL, and the field movement speed VD is calculated using data related to a value of $(t_0-t_{-i})$ according to:

$$VD = \frac{D_0 - D_{-i} + \{\text{lens movement between } t_0 \text{ and } t_i\}}{(t_0 - t_{-i})}, \quad (43)$$

and using the value VD, the future field position may be calculated according to:

$$ZCT(\Delta t) = D_0 + VD \cdot (Ct - t_0) - CM + VD \cdot \Delta t. \quad (44)$$

Moreover, from three data points included in the time interval of each above-described CASE, two curves are produced indicating the field movement locus, and based on these, as is well known, the future field position may be predicted.

Various other ways of modifying the method for predicting future field position may be used, for example:

In CASE 1, the future field position may be predicted by a secondary formula based upon data taken at $t_0$, $t_{-1}$, and $t_{-3}$.

In CASE 2, the future field position may be predicted by a secondary formula based upon data taken at $t_0$, $t_{-1}$, and $t_{-2}$.

In CASE 3, the future field position may be predicted by a primary formula from data taken at $t_0$ and $t_{-1}$. In this manner, the accuracy and response of the prediction can be balanced.

Next, in step S913 of FIG. 23, drive control of the photographic lens is commenced for the above-described predicted field positions.

Figure 24:
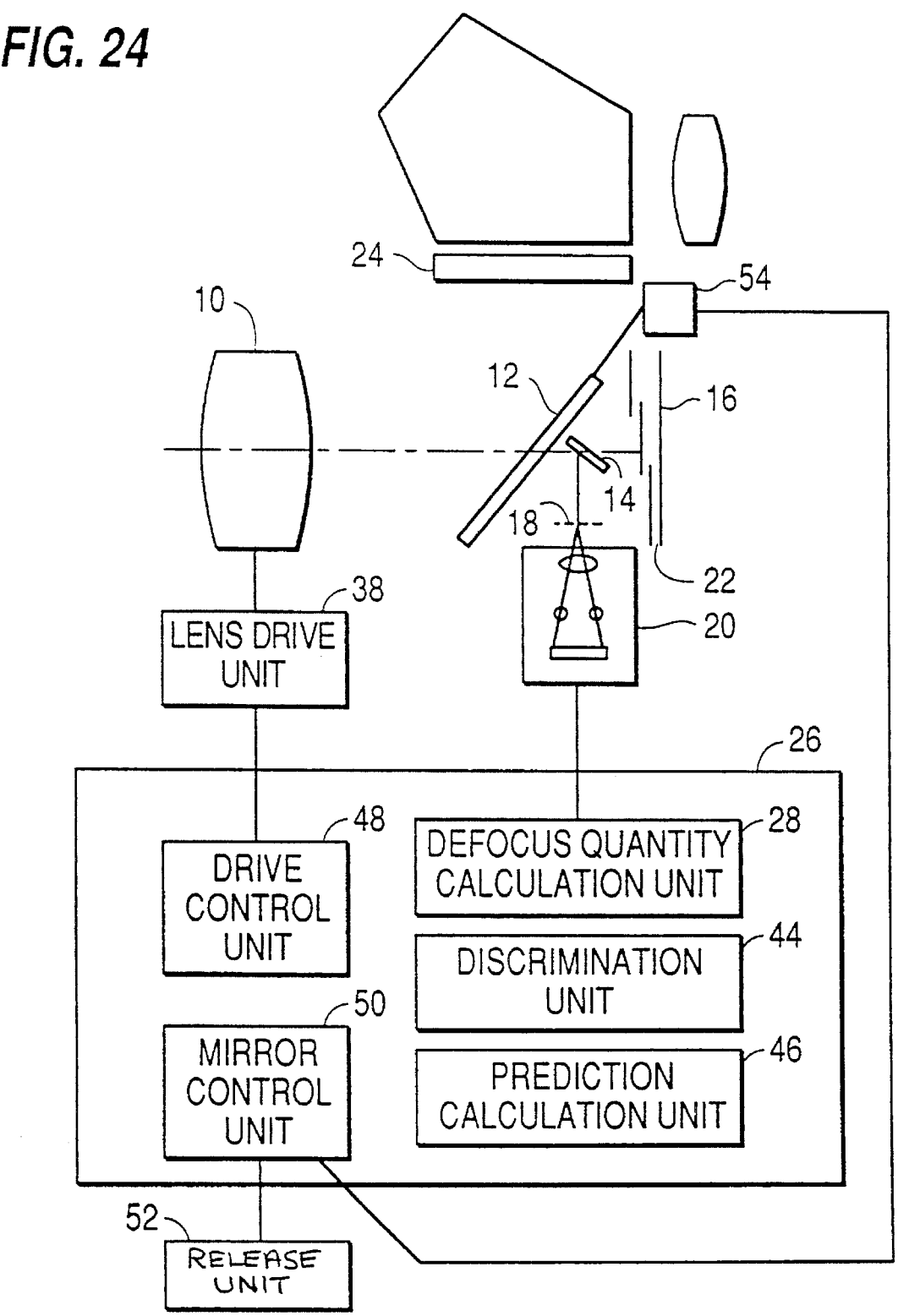
FIG. 24 is a block diagram of a system for detecting and predicting field movement speed and for predicting a future field position in accordance with a third embodiment of the present invention.
Figure 27:
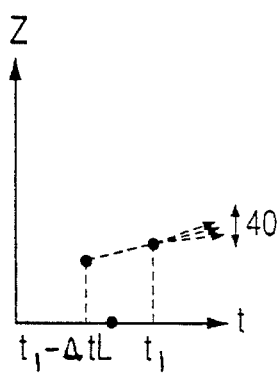
FIG. 27 is a graph illustrating a prior art method for predicting future field position and the resulting error in prediction when a long time period is used between focus detection results.
Figure 28:
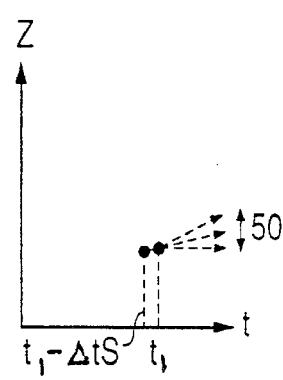
FIG. 28 is a graph illustrating a prior art method for predicting future field position and the resulting error in prediction when a short time period is used between focus detection results.
Figure 29:
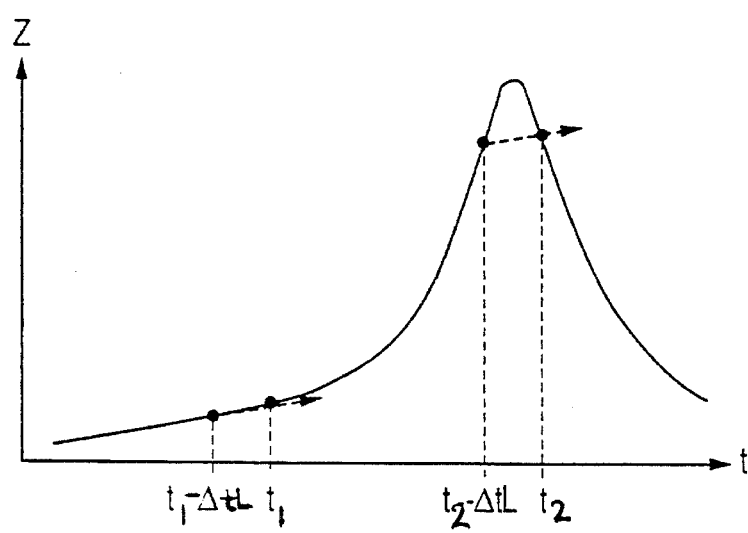
FIG. 29 is a graph illustrating the change in field position with respect to time for a photographic subject.
Figure 30:
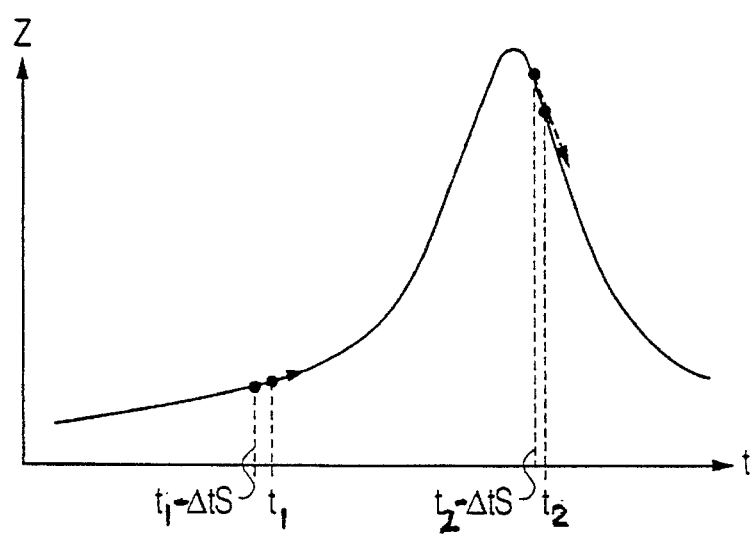
FIG. 30 is a graph illustrating the change in field position with respect to time for a photographic subject.

FIG. 24 shows a third embodiment of a focus detection device having a predictive function in accordance with the present invention. Like elements in the figures of the first, second and third embodiments have like reference numerals. Further, like elements operate in the same manner as described in the first and second embodiments, and a description of those elements will not be repeated here.

According to the third embodiment shown in FIG. 24, a predictive function is performed during photography in rapid succession. When a release button (not shown) located in a release unit 52 of the camera is fully depressed, a signal is transmitted to a mirror control unit 50 of the microcomputer 26, and the mirror control unit 50 activates a mirror control member 54 which shifts the quick-return mirror 12 and sub-mirror 14 in an upward direction to a position beneath a screen matt 24. A shutter control unit, not shown in the drawing, opens a shutter 22 for an exposure time and the film 16 is exposed. After this, the shutter is closed, and the quick-return mirror 12 and sub-mirror 14 return to the original state.

Information does not enter the focus detection block 20 during a blackout period BL between raising and lowering of the quick-return mirror 12 and sub-mirror 14, and focus detection becomes inoperative. In order to perform focus detection during this period when continuous photography takes place, it is necessary to insert a focus detection operation once per period into a continuous blackout, as shown in FIG. 25.

Figure 25:
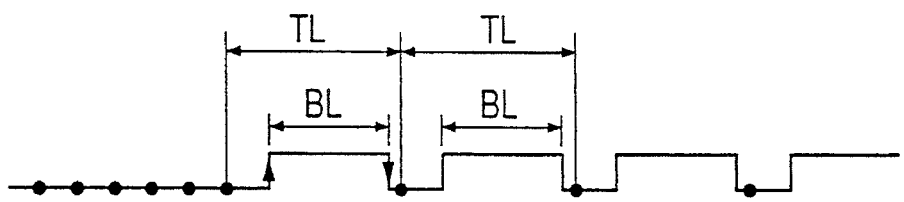
FIG. 25 is a timing diagram showing the intermittent timing accommodating exposure.

In FIG. 25, TL is an interval representing the storage instant during continuous photography. As seen in FIG. 25, the interval TL is larger than the blackout period BL. Because the blackout period is normally about 150 ms to 400 ms, when the change of field movement speed is sudden, it is difficult to perform a correct prediction.

Figure 26:
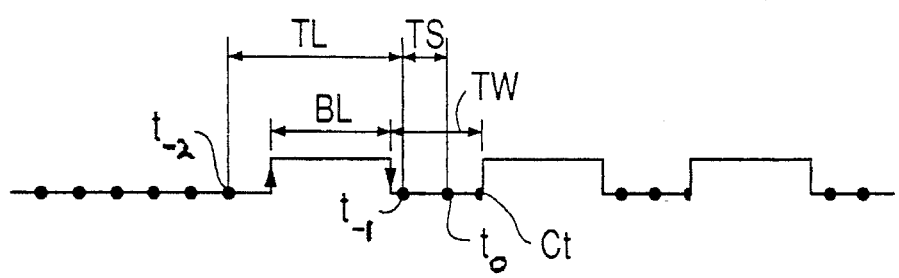
FIG. 26 is a timing diagram showing the intermittent timing accommodating exposure.

Consequently, according to the third embodiment, because focus detection operations are invariably performed at plural times, as seen in FIG. 26, during the period TW between two successive blackouts, the mirror control unit 50 prevents the raising of the mirrors such that the next raising of the mirrors does not occur before the end of storage action a plural predetermined number of times.

In the case of performing storage actions two times during the period TW, after the first storage action, the prediction calculation is not performed. After the second storage action, a respective defocus quantity is calculated and hence prediction calculations are performed.

The flow of the prediction calculations according to the third embodiment will be described with respect to FIG. 23. First, in step S911, the case is discriminated in which the change of field movement speed is large. Plural field movement speeds are determined, and the value having the maximum magnitude is set as the value of the parameter PAL. The field movement speeds relating to TS and TW, shown in FIG. 26, are used as the plural field movement speeds $$PAL = MAX(|V_0|, |V_{-1}|). \quad (45)$$

Where $$V_0 = (D_0 + M_0 - D_{-1})/(t_0 - t_{-1}), \text{ and } V_{-1} = (D_{-1} + M_{-1} - D_{-2})/(t_{-1} - t_{-2}). \quad (46)$$

A large change in field movement speed can be discriminated from the value of PAL.

In step S912, based upon the discrimination result PAL, the method of predicting the future field position is modified, and at least one future field position is predicted using the prediction calculation unit 46.

For example, PAL1 is a predetermined constant set to 4–6 mm/sec, signifying that the field movement speed is small when $$PAL < PAL1 \quad (47)$$

is satisfied. The predicted movement speed VD is determined, based on a long period (TS+TL), according to the equation:

$$VD = (D_0 + M_0 + M_{-1} - D_{-2})/(t_0 - t_{-2}). \quad (48)$$

When PAL does not satisfy the inequality (47), the predicted movement speed VD based on a short period (TS) is determined from the equation:

$$VD = (D_0 + M_0 - D_{-1})/(t_0 - t_{-1}). \quad (49)$$

VD may also be determined from a combination of predicted movement speed VD1 based on a long period (TS+TL), and a predicted movement speed VD2 based on a short period (TS), wherein VD1 and VD2 are assigned different weights according to weighting coefficients f1(PAL) and f2(PAL) which are dependent on PAL. The weighting coefficients f1(PAL) and f2(PAL) are defined as shown in FIG. 10 dependent upon the magnitude of PAL. The forecast movement speed VD based on the combined values of VD1 and VD2 is determined according to:

$$VD = f1 \cdot VD1 + f2 \cdot VD2, \text{ where} \quad (50)$$

$$VD1 = (D_0 + M_0 + M_{-1} - D_{-2})/(t_0 - t_{-2}), \text{ and}$$

$$VD2 = (D_0 + M_0 - D_{-1})/(t_0 - t_{-1}).$$

The method for determining the parameters is, of course, not limited to the example described here. Using the predicted movement speed VD found in the above manner, in FIG. 26, based on the time point Ct at the end of calculation, the future field position after $\Delta t$ seconds can be calculated according to the equation:

$$ZCT(\Delta t) = D_0 + VD \cdot (Ct - t_0) - CM + VD \cdot \Delta t. \quad (51)$$

According to the third embodiment, the mirror is raised and successive exposures are made after calculating the future field position, such that they are in focus at the moment of exposure. Drive control of the photographic lens 10 is commenced in step S913 of FIG. 23 for the predicted field position. The method of driving, such that a subject is in focus at the moment of exposure is controlled such that the point of intersection of the various forecast loci PR in FIGS. 5–7 and the lens locus agree at the instant of exposure.

Because it is recognized that there is a time lag from the instant Ct until the exposure, substituting this time lag $t_{LAG}$ into equation (16), if the lens is driven by the drive quantity ZCT ($t_{LAG}$) during $t_{LAG}$, as in FIG. 7, the drive can be such that the exposure is superposed exactly at the point of intersection with the forecast locus PR. Moreover, when driving the lens as in FIG. 6, driving is effected by ZCT ($t_{LAG}$), and exposure may be made to wait until the instant of $t_{LAG}$. Furthermore, as shown in FIG. 5, at a time $t_{LA}$ shorter than $t_{LAG}$, the forecast locus is followed, and after this, the movement may be at a speed VD. In this case, the advantage is that a good state of focus is maintained even though the instant of exposure is slightly displaced.

The calculation of discrimination from the calculation of the focus detection, the calculation of the future field position, the calculation of the lens drive quantity and the control of the drive are calculations internally processed by the microcomputer 26.

The indispensable plural times of storage were performed in the period TW in the above-described third embodiment example. However, when the change of field movement speed is small, the results relating to plural storage operations sandwiched between the periods during which the mirror is raised can be utilized, so that in this case it is sufficient to perform one storage in the period TW. Because the time used during the period TW can be shortened by proceeding in the above-described manner, it is much preferred because an increase of frame speed can then be provided.

Although a few preferred embodiments of the invention have been shown and described, it will be appreciated by those skilled in the art that changes may be made in these embodiments without departing from the principles and the spirit of the invention, the scope of which is defined in the appended claims and their equivalents.

What is claimed is:

1. A focus adjustment device having a predictive function, comprising:
    (a) a photographic lens;
    (b) an imaging surface on which an image of a photographic subject is formed;
    (c) a focus detection surface;
    (d) a defocus detection device to detect a relative displacement of the imaging surface from the focus detection surface and to intermittently output a defocus quantity indicating an amount of the relative displacement;
    (e) a lens drive unit to drive the photographic lens to a focused state based upon the defocus quantity output by the defocus detection device;
    (f) a first calculation unit to determine a first quantity related to movement speed of the photographic subject based upon defocus quantities output by the defocus detection device during a time period which is greater than a predetermined time period $T_{th}$;
    (g) a second calculation unit to determine a second quantity related to movement speed of the photographic subject based upon defocus quantities output by the defocus detection device during a time period which is shorter than the predetermined time period $T_{th}$;
    (h) a parameter calculating unit to generate a parameter to determine the appropriateness of the first and second quantities with respect to predicting a photographic field position; and
    (i) a control unit to control the lens drive unit, based on the parameter generated by the parameter calculation unit, to drive the lens to correct the photographic field position accompanying movement of the photographic subject according to one of the first quantity, the second quantity, and a combination of the first and second quantity.

2. The focus adjustment device, as recited in claim 1, wherein the control unit selects one of the first quantity and the second quantity based upon the generated parameter to control the lens drive unit, and further, the control unit combines the first quantity and the second quantity by assigning each of the first quantity and the second quantity weights according to weighing functions which are a function of the generated parameter.

3. The focus adjustment device, as recited in claim 2, wherein the parameter is a quantity determined in relation to at least one of a field movement speed and a field movement acceleration accompanying movement of the photographic subject.

4. The focus adjustment device, as recited in claim 2, wherein the parameter is a quantity related to at least one of a focus length of the photographic lens, a focusing distance, a photographic magnification, and an amount of extension of the lens.

5. A focus adjustment device having a predictive function, comprising:
    (a) a photographic lens;
    (b) an imaging surface on which an image of a photographic subject is formed;
    (c) a focus detection surface;
    (d) a defocus detection device to detect a relative displacement of the imaging surface from the focus detection surface and to intermittently output a defocus quantity indicating an amount of relative displacement;
    (e) a lens drive unit which drives the photographic lens to a focused state based upon the defocus quantity output by the defocus detection device;
    (f) a first calculation unit to determine a first quantity relating to a future field position of the photographic lens based upon plural defocus quantities output during a time period which is longer than a predetermined time period $T_{th}$;
    (g) a second calculation unit to determine a second quantity relating to a future field position of the photographic lens based upon plural defocus quantities output during a time period which is shorter than the predetermined time period $T_{th}$;
    (h) a parameter calculation unit to generate a parameter to determine the appropriateness of the first quantity and the second quantity with respect to predicting a photographic field position; and
    (i) a control unit to control the lens drive unit, based on the parameter generated by the parameter calculation unit, to drive the lens to correct the movement of the photographic field position accompanying the movement of the photographic subject according to one of the first quantity, the second quantity, and a combination of the first and second quantity.

6. The focus adjustment device, as recited in claim 5, wherein the control unit selects one of the first quantity and the second quantity based upon the generated parameter to control the lens drive unit, and further, the control unit combines the first quantity and the second quantity by assigning each of the first quantity and the second quantity weights according to weighing functions which are a function of the generated parameter.

7. The focus adjustment device, as recited in claim 6, wherein the parameter is a quantity determined in relation to at least one of a field movement speed and a field movement acceleration accompanying movement of the photographic subject.

8. The focus adjustment device, as recited in claim 6, wherein the parameter is a quantity related to at least one of a focus length of the photographic lens, a focusing distance, a photographic magnification, and an amount of extension of the lens.

9. A focus adjustment device having a predictive function, comprising:
    (a) a photographic lens;
    (b) an imaging surface on which an image of a photographic subject is formed;
    (c) a focus detection surface;
    (d) a defocus detection device to detect a relative displacement of the imaging surface from the focus detection surface and to intermittently output a defocus quantity indicating an amount of relative displacement;

(e) a lens drive unit to drive the photographic lens to a focused state based upon the defocus quantity output by the defocus detection device;

(f) a first calculation unit to determine a first quantity related to the movement speed of the photographic subject based upon plural defocus quantities generated during a time period during which a first number of defocus quantities are detected;

(g) a second calculation unit to determine a second quantity related to the movement speed of the photographic subject based upon plural defocus quantities generated during a time period during which a second number of defocus quantities are detected, the second number of defocus quantities being smaller than the first number of defocus quantities;

(h) a parameter calculating unit to generate a parameter to determine the appropriateness of the first and second quantities with respect to predicting a photographic field position; and (i) a control unit to control the lens drive unit, based on the parameter generated by the parameter calculation unit, to drive the lens to correct the photographic field position accompanying movement of the photographic subject, according to one of the first quantity, the second quantity and a combination of the first quantity and the second quantity.

10. The focus adjustment device, as recited in claim 9, wherein the control unit selects one of the first quantity and the second quantity based upon the generated parameter to control the lens drive unit, and further, the control unit combines the first quantity and the second quantity by assigning each of the first quantity and the second quantity weights according to weighing functions which are a function of the generated parameter.

11. The focus adjustment device, as recited in claim 10, wherein the parameter is a quantity determined in relation to at least one of a field movement speed and a field movement acceleration accompanying movement of the photographic subject.

12. The focus adjustment device, as recited in claim 10, wherein the parameter is a quantity related to at least one of a focus length of the photographic lens, a focusing distance, a photographic magnification, and an amount of extension of the lens.

13. A focus adjustment device having a predictive function, comprising:

(a) a photographic lens;

(b) an imaging surface on which said photographic lens forms an image of a photographic subject;

(c) a focus detection surface;

(d) a defocus detection device to detect a relative displacement of the imaging surface from the focus detection surface and to intermittently output a defocus quantity indicating an amount of relative displacement;

(e) a lens drive unit to drive the photographic lens to a focused state based upon a defocus quantity output by the defocus detection device;

(f) a first calculation unit to determine a first quantity relating to a future field position of the photographic lens based upon plural defocus quantities generated during a time period during which a first number of defocus quantities are detected;

(g) a second calculation unit to determine a second quantity relating to a future field position of the photographic lens based upon plural defocus quantities generated during a time period during which a second number of defocus quantities are detected, the second number of defocus quantities being smaller than the first number of defocus quantities;

(h) a parameter calculation unit to generate a parameter to determine the appropriateness of the first quantity and the second quantity with respect to predicting a future field position; and (i) a control unit to control the lens drive unit, based upon the parameter generated by the parameter calculation unit, to drive the lens to correct the field position accompanying the movement of the photographic subject according to one of the first quantity, the second quantity, and a combination of the first quantity and the second quantity.

14. The focus adjustment device, as recited in claim 13, wherein the control unit selects one of the first quantity and the second quantity based upon the generated parameter in order to control the lens drive unit, and further, the control unit combines the first quantity and the second quantity by assigning each of the first quantity and the second quantity weights according to weighting functions which are a function of the generated parameter.

15. The focus adjustment device, as recited in claim 14, wherein the parameter is a quantity determined in relation to at least one of a field movement speed and a field movement acceleration accompanying movement of the photographic subject.

16. The focus adjustment device, as recited in claim 14, wherein the parameter is a quantity related to at least one of a focus length of the photographic lens, a focusing distance, a photographic magnification, and an amount of extension of the lens.

17. A focus detection device for a camera which performs photography in rapid succession, comprising:

(a) a photographic lens;

(b) an imaging surface on which an image of a photographic subject is formed;

(c) a predetermined detection surface;

(d) a defocus detection unit to detect a relative displacement of the imaging surface from the predetermined detection surface and to intermittently output a defocus quantity indicating an amount of relative displacement;

(e) a lens drive unit which drives the photographic lens to a focused state based upon the defocus quantity output by the defocus detection device;

(f) a mirror unit to reflect light from the photographic lens to the imaging surface;

(g) a discrimination unit to discriminate whether a change of field movement speed accompanying the movement of a photographic subject corresponds to a first state or a second state;

(h) a prediction calculation unit to modify a method of prediction calculation for predicting a future field position based upon a result of the discrimination unit;

(i) a mirror control unit to raise the mirror unit when a storage operation is performed in order for focus detection to be performed at least one time during a period TW between the lowering of the mirror unit and the next raising of the mirror unit during photography in rapid succession; and (j) a control unit to drive the photographic lens to a focused state based upon an output of the prediction calculation unit.

18. The focus detection device, as recited in claim 17, wherein the discrimination unit, discriminates that the change of field movement speed corresponds to the second state, and the prediction calculation unit modifies the method of prediction calculation performed according to the result of plural defocus quantities interposed between periods during which the mirror unit is raised.

19. The focus detection device, as recited in claim 17, wherein the discrimination unit, discriminates that the change of field movement speed corresponds to the second state, and storage is performed once during the period TW.

* * * * *